US008700775B2

(12) United States Patent
Hopen et al.

(10) Patent No.: US 8,700,775 B2
(45) Date of Patent: Apr. 15, 2014

(54) ROUTING OF COMMUNICATIONS TO A PLATFORM SERVICE

(75) Inventors: Chris A. Hopen, Shoreline, WA (US); Gary B. Tomlinson, Woodinville, WA (US); John Brooke, Gig Harbor, WA (US); Derek W. Brown, Sunnyvale, CA (US); Jonathan Burdge, Renton, WA (US); Rodger D. Erickson, Lawrence, KS (US)

(73) Assignee: Aventail LLC, San Jose, CA (US)

( * ) Notice: Subject to any disclaimer, the term of this patent is extended or adjusted under 35 U.S.C. 154(b) by 921 days.

(21) Appl. No.: 11/903,219

(22) Filed: Sep. 21, 2007

(65) Prior Publication Data

US 2008/0126545 A1    May 29, 2008

Related U.S. Application Data

(62) Division of application No. 10/733,808, filed on Dec. 10, 2003.

(51) Int. Cl.
*G06F 15/16* (2006.01)
*G06F 15/173* (2006.01)

(52) U.S. Cl.
USPC .......................... 709/226; 709/227; 709/238

(58) Field of Classification Search
USPC ................... 709/203, 226–229, 238
See application file for complete search history.

(56) References Cited

U.S. PATENT DOCUMENTS

| | | | |
|---|---|---|---|
| 5,774,660 A | 6/1998 | Brendel et al. | |
| 6,052,780 A | 4/2000 | Glover | |
| 6,128,279 A | 10/2000 | O'Neil et al. | |
| 6,138,153 A | 10/2000 | Collins, III et al. | |
| 6,145,089 A | 11/2000 | Le et al. | |
| 6,246,755 B1 | 6/2001 | Walker et al. | |
| 6,374,300 B2 | 4/2002 | Masters | |
| 6,411,986 B1* | 6/2002 | Susai et al. | 709/203 |
| 6,438,652 B1 | 8/2002 | Jordan et al. | |
| 6,473,802 B2 | 10/2002 | Masters | |
| 6,701,437 B1 | 3/2004 | Hoke | |
| 6,789,118 B1 | 9/2004 | Rao | |
| 6,850,943 B2 | 2/2005 | Teixeira et al. | |
| 6,873,988 B2 | 3/2005 | Herrmann et al. | |
| 6,920,502 B2 | 7/2005 | Araujo et al. | |

(Continued)

FOREIGN PATENT DOCUMENTS

| | | |
|---|---|---|
| EP | 0804012 | 10/1997 |
| EP | 1308822 | 5/2003 |

(Continued)

OTHER PUBLICATIONS

RFC: 2616, R. Fielding, Hypertext Transfer Protocol—HTTP/1.1, Jun. 1999.*

(Continued)

*Primary Examiner* — Joshua Joo

(74) *Attorney, Agent, or Firm* — Lewis Roca Rothgerber LLP

(57) ABSTRACT

Systems and methods for routing communications to a platform service are provided. A message including payload data is received. The information in the payload data of the message is examined in order to determine the type of message. The message is then relayed to an appropriate platform service based on the type of message. Some embodiments assign numbers to the packets that make up the message.

17 Claims, 8 Drawing Sheets

(56) References Cited

U.S. PATENT DOCUMENTS

| | | | |
|---|---|---|---|
| 6,973,486 | B2 | 12/2005 | Blakeney |
| 7,032,022 | B1 | 4/2006 | Shanumgam et al. |
| 7,068,640 | B2 | 6/2006 | Kakemizu et al. |
| 7,216,158 | B2 | 5/2007 | Revanuru et al. |
| 7,266,715 | B1 | 9/2007 | Bazzinotti |
| 7,526,551 | B1 | 4/2009 | Islam |
| 8,438,254 | B2 | 5/2013 | Hopen |
| 2002/0112189 | A1 | 8/2002 | Syvanne |
| 2003/0093691 | A1* | 5/2003 | Simon et al. .................. 713/201 |
| 2003/0191944 | A1 | 10/2003 | Rothrock |
| 2003/0196091 | A1 | 10/2003 | Raley et al. |
| 2003/0212788 | A1 | 11/2003 | Wilding et al. |
| 2003/0229613 | A1 | 12/2003 | Zargham |
| 2004/0078621 | A1 | 4/2004 | Talaugon |
| 2005/0132030 | A1 | 6/2005 | Hopen |
| 2008/0183854 | A1 | 7/2008 | Hopen |

FOREIGN PATENT DOCUMENTS

| | | |
|---|---|---|
| WO | WO 99/57866 | 11/1999 |
| WO | WO 02/37799 | 5/2002 |
| WO | WO 02/099571 | 12/2002 |
| WO | WO 2005/060211 | 6/2005 |

OTHER PUBLICATIONS

T. Berners-Lee, Hypertext Transfer Protocol—HTTP/1.0, Feb. 1996.*

"SA-1000: An entry-level SSL VPN solution for secure access," Aventail Data Sheet, 2003 Aventail Corporation.

"Roaming Internet Access: Easy. Cost-effective. Global," Aventail. Net Manged Service, Aventail Data Sheet, 2003 Aventail Corporation.

"Managed Directory: Reduce Administration. Enable single sign-on," Aventail.Net Managed Service, Aventail Data Sheet, 2003 Aventail Corporation.

"User Management: Simplified administration. Fast user activation," Aventail.Net Manged Service, Aventail Data Sheet, 2003 Aventail Corporation.

"Aventail EX-1500," SC Magazine Best Buy, Groupt Test VPNs, SC Magazine Sep. 2003.

Aventail, Corporate Overview, 2002 Aventail Corporation.

Michael Vizard, "Aventail CEO Evan Kaplan explains why infrastructure service providers are emerging as strategic IT partners," Interviews, InfoWorld, Jun. 8, 2001, 2001 InfoWorld Media Group, Inc.

Heather B. Hayes, "Security for hire," Professional Edge, InfoWorld, Dec. 10, 2001, Issue 50, 2001 InfoWorld Media Group, Inc.

Awards and Recognition, Aventail, 2003 Aventail Corporation.

"Aventail EX-1500," Product Data Sheet, 2003 Aventail Corporation.

Field Notes, "Outsourcing Can Help," ComputerWorld, Jul. 15, 2002; vol. 36, No. 29, 2002 Computerworld, Inc.

Ann Bednarz et al., "The 50 Most Powerful People in Networking," Network World Reprint, Oct. 21, 2002, vol. 19, No. 42, 2002 Network World, Inc.

Chris Hopen, "Face-off: Are SSL-based VPNs a better bet than IPSec VPNs?", Network World Reprint, Aug. 4, 2003, vol. 20, No. 31, 2003 Network World, Inc.

Mark Bradshaw, "Virtually Complete," European Communications, Reprinted from Summer 2003, www.eurocomms.co.uk.

"Aventail Anywhere VPN Module," Aventail Technical Overview, 2002 Aventail Corporation.

"SA-900: An enterprise-class SSL VPN solution for secure access," Aventail Data Sheet, 2003 Aventail Coporation.

"Aventail ExtraWeb Module," Aventail Technical Overview, 2002 Aventail Corporation.

Communication Relating to the International Search Report and the Written Opinion of The International Searching Authority in the corresponding PCT application, application No. PCT/US2004/041183.

Communication Relating to the International Search Report and the Written Opinion of The International Searching Authority in the corresponding PCT application, application No. PCT/US2004/041487.

Sheryl Canter, "Kill Internet Ads with HOSTS and PAC files," 'Online!', Mar. 20, 2004, http://web/archive.org/web20040426140542/http://windowsdevcenter.com/pub/a/windows/2004/0.

Ulrich Kritzner, "Objektreferenz-Das navigator-Objekt," Javascript-Tutorial, 'Online!', Mar. 31, 2002, XP 002331683, http://webarchive.org/web/20020331004028/http://js-tut.aardon.de/js-tut/anhangA/havigator.html.

Office Action for U.S. Appl. No. 10/733,808 mailed Jul. 11, 2013.

PCT Search Report and Written Opinion for PCT/US2004/041183 mailed Mar. 15, 2005.

* cited by examiner

ROUTING OF COMMUNICATIONS TO A PLATFORM SERVICE

CROSS REFERENCE TO RELATED PATENT APPLICATIONS

This application is divisional and claims the priority benefit of U.S. patent application Ser. No. 10/733,808 filed Dec. 10, 2003, the disclosure of which is incorporated by reference.

BACKGROUND OF THE INVENTION

1. Field of the Invention

The present invention relates to a network appliance for managing a variety of software and network services, such as access method and load balancing services. Various aspects of the present invention are particularly applicable to a network appliance that cooperates with other network appliances to provide multiple software and network services with high reliability.

2. Description of Related Art

In the last decade, the use of electronic computer networks has exploded. Electronic computer networks may be found in businesses, schools, hospitals, and even residences. With these networks, two or more computing devices communicate together to exchange packets of data according to one or more standard protocols, such as the TCP/IP protocols. Usually, one computer, often referred to as a "client," requests that a second computer perform a service. In response, the second computer, often referred to as a "server," performs the service and communicates the resulting data back to the first computer. Some computer networks may also include one or more switches, for providing connectivity between one or more clients and one or more servers.

Larger networks may include additional components to manage communications between clients and servers. For example, a large network having multiple servers may include one or more load balancers, to route client communications among the server computers. A load balancer may direct a client communication to a server based upon the workload of other servers in the network, or to ensure that a communication carrying data affiliated with a specific server is properly directed to that server. If a network performs a vital purpose, the network may duplicate one or more components for redundancy, in the event that a component fails.

FIG. 1 illustrates one example of a conventional communication network 101. More particularly, the network 101 may be employed to provide a client computer with secure access through a public network 103, such as the Internet, to a private network or "Intranet" 105. As seen in this Figure, the communication network 101 includes a first group of switches 107, a group of load balancers 109, a second group of switches 111, a group of access servers 113, and a third group of switches 115. As will be appreciated by those of ordinary skill in the art, the networks 101, 103 and 105 also will include one or more routers (not shown) for routing communications between the networks to a specified network address.

To use the communication network 101, a client computer transmits a communication through the Internet 103 to a switch 107. The illustrated network 101 includes two switches 107, but other implementations of the network 101 may include only a single switch 107 or three or more switches 107 as desired, depending upon the amount of redundancy desired in the network. The switch 107 receiving the communication delivers it to a load balancer 109. As will be appreciated by those of ordinary skill in the art, the load balancer 109 is a computing device that directs incoming communications to an access server 113 through a switch 111. For example, if a communication is new, the load balancer 109 may route the communication to the access server 113 that is currently handling the fewest communications. Alternately, the load balancer 109 may employ a "round robin" process to assign each new communication to the next access server 113 in an ordered list. If, however, the communication includes data that is affiliated with a particular access server 113, as will be explained in more detail below, then the load balancer 109 may route the communication to that particular access server 113.

The access server 113 provides one or more platform services, including at least one access method service for securely accessing the Intranet 105. For example, the access server 113A may provide an extranet Web service (EW), which allows a client computer to securely access the Intranet 105 through a browser using an encryption technique such as, for example, the Secure Sockets Layer (SSL) encryption technique. The access server 113A may also provide a node management (NM) service and a repository service for storing information, such as local authentication information like user names, passwords, and digital certificates. The repository service may also be used to store user personal profile information, such as user names, single sign-on credentials for intranet servers, bookmarks and the like. The repository service may be, e.g., a directory employing the Lightweight Directory Access Protocol (LDAP).

The access server 113A may also provide a distributed cache service which shares and replicates useful data among multiple access servers 113. The access server 113B may then alternately provide a virtual private network (VPN) service, which allows a client computer to act as a node of the Intranet 105 using an encryption technique such as, for example, the SSL encryption technique. The access server 113B may additionally provide a node management service and a repository service like the access server 113A.

Once a communication from a client computer has been decrypted and processed by an access server 113, it is then routed back through a switch 111 to a load balancer 109. The load balancer 109 directs the communication through a switch 115 to the Intranet 105. When a computer in the Intranet 105 responds to the communication from a client, the process is reversed to encrypt the outgoing response and transmit it to the client computer back through the Internet 103.

In the network 101, both the extranet Web service of the access server 113A and the virtual private network service of the access server 113B will generate an encryption "session" for related communications from a client computer. An encryption session, such as an SSL session, allows each client communication and reply associated with the session to be processed using encryption key information. A client computer could be required to authenticate itself for each domain, software service or network device it needs to access. Using authentication management software, a client computer may also authenticate itself only once per encryption session, i.e., during the initial communication, and the network access system may cache the authentication information for the session. The client computer can then include an identifier for the session in subsequent communications, rather than having to repeatedly submit its authentication information.

The network 101 may also employ the session identifier to accurately route a communication to the access server hosting the associated encryption session. More particularly, a communication from a client computer may include a virtual Internet protocol address or "VIP" address. This type of address is not associated with a particular computing device, but may instead be translated by a network address translation (NAT) process into one or more actual Internet protocol addresses for particular computing devices. When a load balancer 109 receives a communication, it checks the communication for a session identifier. If the communication includes a session identifier, then the load balancer 109 uses a lookup table to associate that session identifier with the actual Internet protocol address for the access server 113 hosting the corresponding encryption session. The load balancer 109 can then execute a network address translation that translates the virtual Internet protocol address into the actual Internet protocol address for the access server 113 hosting the session. If the communication does not include a session identifier, then the load balancer 109 will route the communication to any appropriate access server 113 based upon its load balancing algorithm.

While two load balancers 109 are illustrated in the communication network 101, only one load balancer 109 typically will operate at any time. More particularly, incoming communications may also employ a virtual media control access (MAC) address to access the network 101. As will be appreciated by those of ordinary skill in the art, the routers in the networks 101 and 105 will map an Internet protocol address to a media access control address associated with the hardware of a particular device using the address resolution protocol (ARP). The switches 107 and 115 will then passively map a media access control address to a switch port. Accordingly, the load balancer 109 which is acting as the primary load balancer 109 will associate itself with both the virtual Internet protocol address and the virtual media access control address. If the primary load balancer 109 fails, then the secondary load balancer 109 will associate itself with the virtual Internet protocol address and the virtual media access control address, ensuring that subsequent communications are routed to it and thereby taking over the load balancing responsibilities from the primary load balancer 109.

Because the primary load balancer 109 is responsible for directing incoming communications to the access servers 113, the primary load balancer 109 monitors the status of other components in the network 101. For example, the primary load balancer 109 may employ an interface monitoring service, which determines when a network pathway, such as an interface or switch port, fails. Thus, if the interface monitoring service determines that a network pathway to an access server 113 has failed, then the load balancer 109 will not direct client communications to that access server 113. The primary load balancer 109 may also employ a service monitoring service that determines when a service provided by the access servers 113 fails. If the service monitoring service determines that a particular service provided by an access server 113 has failed (e.g., a VPN service), then the load balancer 109 will avoid directing any communications requiring the failed service to that access server 113. The load balancer 109 may, however, still route other types of communications to that access server 113 if its other services (e.g., the repository service) have not failed.

While this arrangement has been successfully employed in a variety of networks, it has a number of disadvantages. For example, each component and each interface and connection between the different components the network 101 represents a point in the network 101 that can really fail. Thus, a single load balancer 109 has five points at which it functionality can fail. First, the load balancer 109 can itself fail. Second, the interface or connection of the load balancer with a switch 111 can fail. Third, a switch 111 can fail. Fourth, the interface or connection of the load balancer with a switch 115 can fail, and fifth, a switch 115 can fail.

In addition to the high number of failure points, the network 101 requires a great deal of effort from a network administrator or other person responsible for maintaining it. Each separate component must be installed, set up, assigned a network address, and maintained. Still further, the network 101 is very expensive.

For example, a single load balancer may cost several thousands of dollars. Having only a primary and a secondary (or backup) load balancer 109 can significantly add to the price of the network 101, and having additional backup load balancers 109 will further increase the price of the network 101.

SUMMARY OF THE INVENTION

Systems and methods of the present invention provide for routing communications to a platform service. A message that contains data indicating where it should be directed is received, and information in the payload data of the message is examined in order to determine the type of message. The message is then relayed to an appropriate platform service based on the type of message.

An embodiment of the present invention includes methods for routing communications to a platform service. The first part of a communication may be received and acknowledged. The second part of the communication containing payload data may also be received and the payload data analyzed. Based on information in the payload data analysis, the first part of the communication may then be relayed to a platform service, which acknowledges it. The second part of the communication may also be relayed to the platform service. The platform service may reply to the second part of the communication, which is relayed back to the source of the original communication. In some embodiments of the present invention, the various parts of the communication may be numbered. The parts may be re-numbered in different communications. Some embodiments of the present invention also allow for reconciliation when there are multiple numbering systems.

An embodiment of the present invention includes alternate methods for routing communications to a platform service. A communication that includes payload data may be received. The payload data may indicate a type of communication associated with a platform service. The communication is then relayed to the appropriate platform service. In some embodiments, the platform service may send a reply, which may be relayed to a source of the original communication.

An embodiment of the present invention includes systems for routing communications to a platform service. Such systems may include an input for receiving a communication, a processor that executes instructions for determining the type of communication, and an output for relaying the communication to a platform service. The communication may include payload data, which may indicate what type of communication was received. Some embodiments of the present invention further include one or more platform services.

DETAILED DESCRIPTION

Various embodiments of a network appliance according to the invention may be implemented using electronic hardware. More typically, however, the various features of the invention will be implemented by executing software instructions on a programmable computing device or computer. Accordingly, FIG. 2 shows one example of a computer 201 that can be used to implement a network appliance according to different embodiments of the invention.

Figure 2:
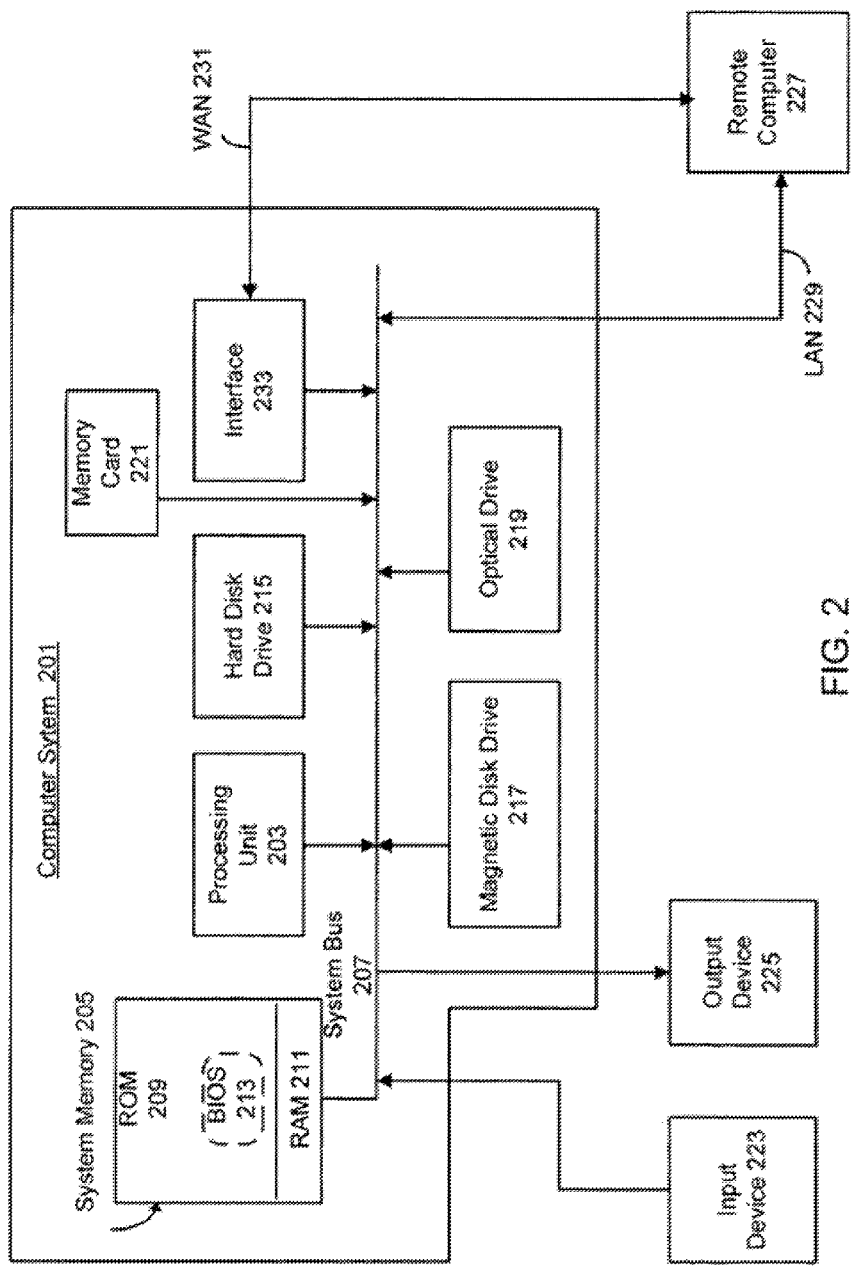
FIG. 2 shows an example of a computing device that can be used to implement a network appliance according to various examples of the invention.

The computer system 201 illustrated in FIG. 2 includes a processing unit 203, a system memory 205, and a system bus 207 that couples various system components, including the system memory 205, to the processing unit 203. The system memory 205 may include a read-only memory (ROM) 209 and a random access memory (RAM) 211. A basic input/output system 213 (BIOS), containing the routines that help to transfer information between elements within the computer system 201, such as during startup, may be stored in the read-only memory (ROM) 209. If the computer system 201 is embodied by a special-purpose "server application" computer system 201, it may further include, for example, another processing unit 203, a hard disk drive 215 for reading from and writing to a hard disk (not shown), a magnetic disk drive 217 for reading from or writing to a removable magnetic disk (not shown), or an optical disk drive 219 for reading from or writing to a removable optical disk (not shown) such as a CD-ROM or other optical media.

A number of program modules may be stored on the ROM 209, the hard disk drive 215, the magnetic disk drive 217, and the optical disk drive 219. A user may enter commands and information into the computer system 201 through an input device 223, such as a keyboard, a pointing device, a touch screen, a microphone, a joystick or any other suitable interface device. Of course, the computer system 201 may employ a variety of different input devices 223, as is known in the art. An output device 225, such as a monitor or other type of display device, is also included to convey information from the computer system 201 to the user. As will be appreciated by those of ordinary skill in the art, a variety of output devices 225, such as speakers and printers, may alternately or additionally be included in the computer system 201.

In order to access other computing devices, the computer system 201 is capable of operating in a networked environment using logical connections to one or more remote computing devices, such as the remote computing device 227. The computer system 201 may be connectable to the remote computer 227 through a local area network (LAN) 229 or a wide area network (WAN) 231, such as the Internet. When used in a networking environment, the computer system 201 may be connected to the network through an interface 233, such as a wireless transceiver, a modem, an Ethernet or Token Ring, connection, or any other such interface. While the interface 233 is illustrated as an internal interface in FIG. 2, it may alternately be an external interface as is well known in the art. Of course, it will be appreciated that the network connections shown in this figure are exemplary, and other means of establishing a communications link with other computers may be used.

Various implementations of the invention may employ two or more computer systems 201. As previously noted, several input and output devices, such as monitors, mice and keyboards, may be used to control a single computer system 201. When two or more computer systems 201 are employed together, a Keyboard/Video/Mouse (KVM) switch may be used to allow the functions of a single monitor, mouse, and keyboard to be used for each of the computer system 201. For a typical server application computer system 201, the form factor of the computing system 201 will be much more compact than, for example, a personal computer type computing system, and may not be particularly conducive to the use a keyboard, monitor, and mouse even if a KVM is used to control several systems 201. Instead, a server application type computer system 201 may employ alternate methods for providing input to and receiving output from the computer system 201.

For example, software running on the computer system 201 may be employed that allows a command line interface for the system 201 to be accessed remotely. One such example of this access software is called "Telnet," but this software suffers from inherent insecurity in that the Telnet communications traversing a network are in clear text and can easily be intercepted by others. To solve this problem, a secure version of telnet, referred to as "stelnet," was developed, along with a much faster and completely different type of access software employing the secure shell (SSH) protocol.

While this type of access software, such as SSH protocol software, stelnet, and Telnet, may be used for administering a computer system 201, it is only operational as long as the software is running and functional on the computer system 201. When administrative tasks need to be performed while this software is not running or functioning, (e.g., to troubleshoot this software, when installing a new computer system 201, or to reboot the computer system 201), an administrator can access the computer system 201 via, for example, a serial connection physically located in the computer system 201 and controlled by special code permanently imprinted on circuitry outside of the primary operating system. This serial system can be access remotely via the use of a remote access to the serial connection, typically referred to as a "Terminal Server."

A Dual-Homed Network

Figure 3:
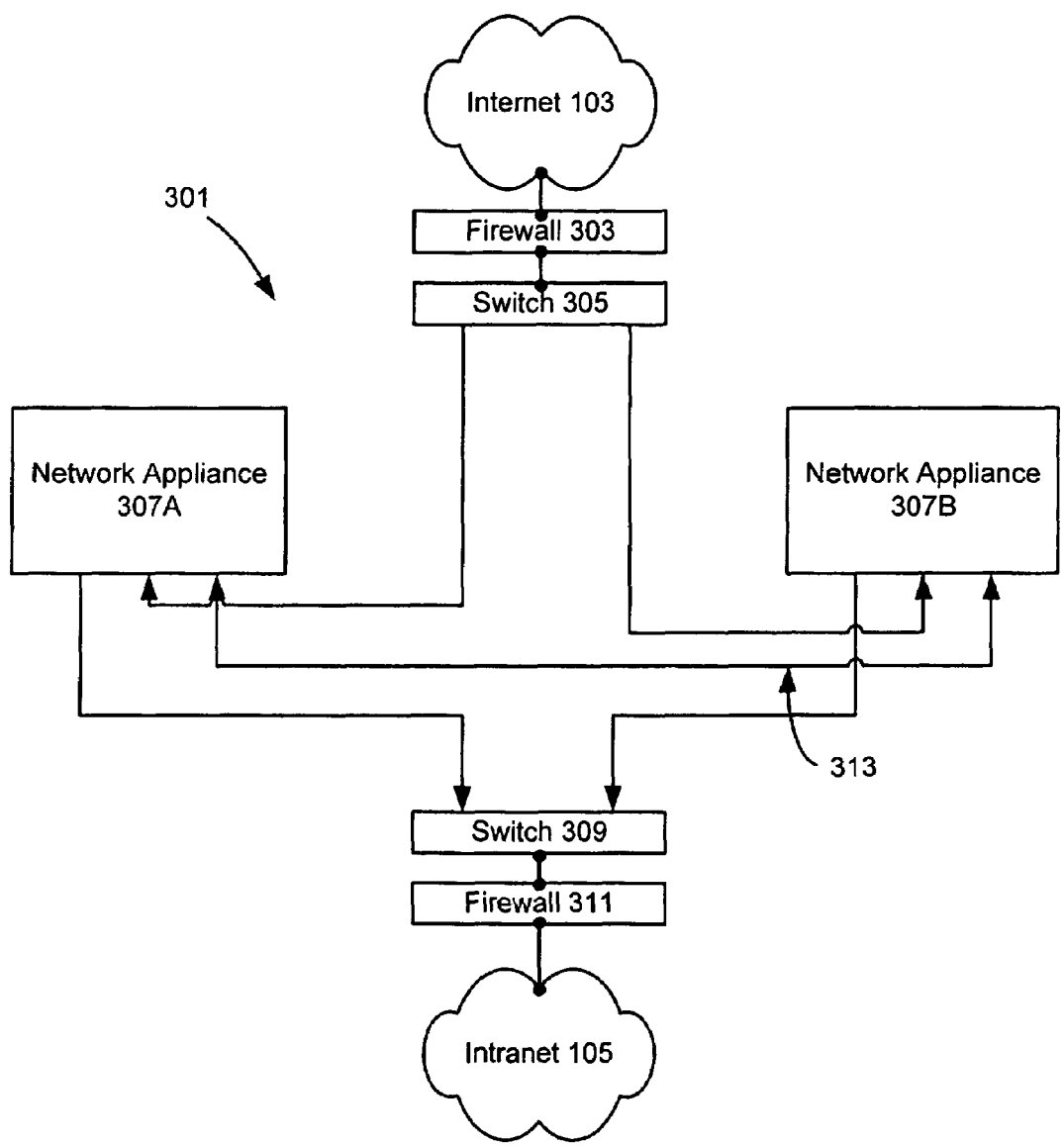
FIG. 3 shows an example of a network employing two network appliances according to various examples of the invention.

FIG. 3 illustrates one example of a "dual-homed" network 301 that employs a network appliance according to various examples of the invention. As used herein, the term "dual-homed" refers to the use of the network 301 to connect two separate networks (e.g., the Internet 103 and an Intranet 105 in the illustrated example).

Thus, there are two separate access points to the network 301. As seen in this Figure, the network 301 includes a firewall 303 connected to a switch 305. The switch 305 in turn is connected to two network appliances 307 according to various examples of the invention. The network appliances 307 are connected to a second switch 309, which is connected to a second firewall 311. The firewall 311 provides access to the Intranet 105.

A backplane connection 313 connects the two network appliances 307 so that they may quickly exchange data, as will be discussed in more detail below. As known to those of ordinary skill in the art, a backplane is a circuit board or framework that supports other circuit boards, devices, and the interconnections among devices. Because the network appliances 307A and 307B are connected via the backplane 313, they can exchange data without the delay incurred by transmitting data through a switching device. Moreover, because the backplane is a dedicated network link between the network appliances 307A and 307B, it has dedicated bandwidth and thus a very low latency. A 10/100/1000 megabit Ethernet card may be employed to connect backplane 313 to the network appliances 307A and 307B, for example.

It should be noted that, with alternate embodiments of the invention, the network 301 may contain additional or alternate devices. For example, with some embodiments of the invention, the network 301 may omit the firewall 303, the firewall 311, or both. Also, one or both of the switches 303 and 309 may be replaced with a hub or other type of bus device.

The Network Appliance

Figure 4:
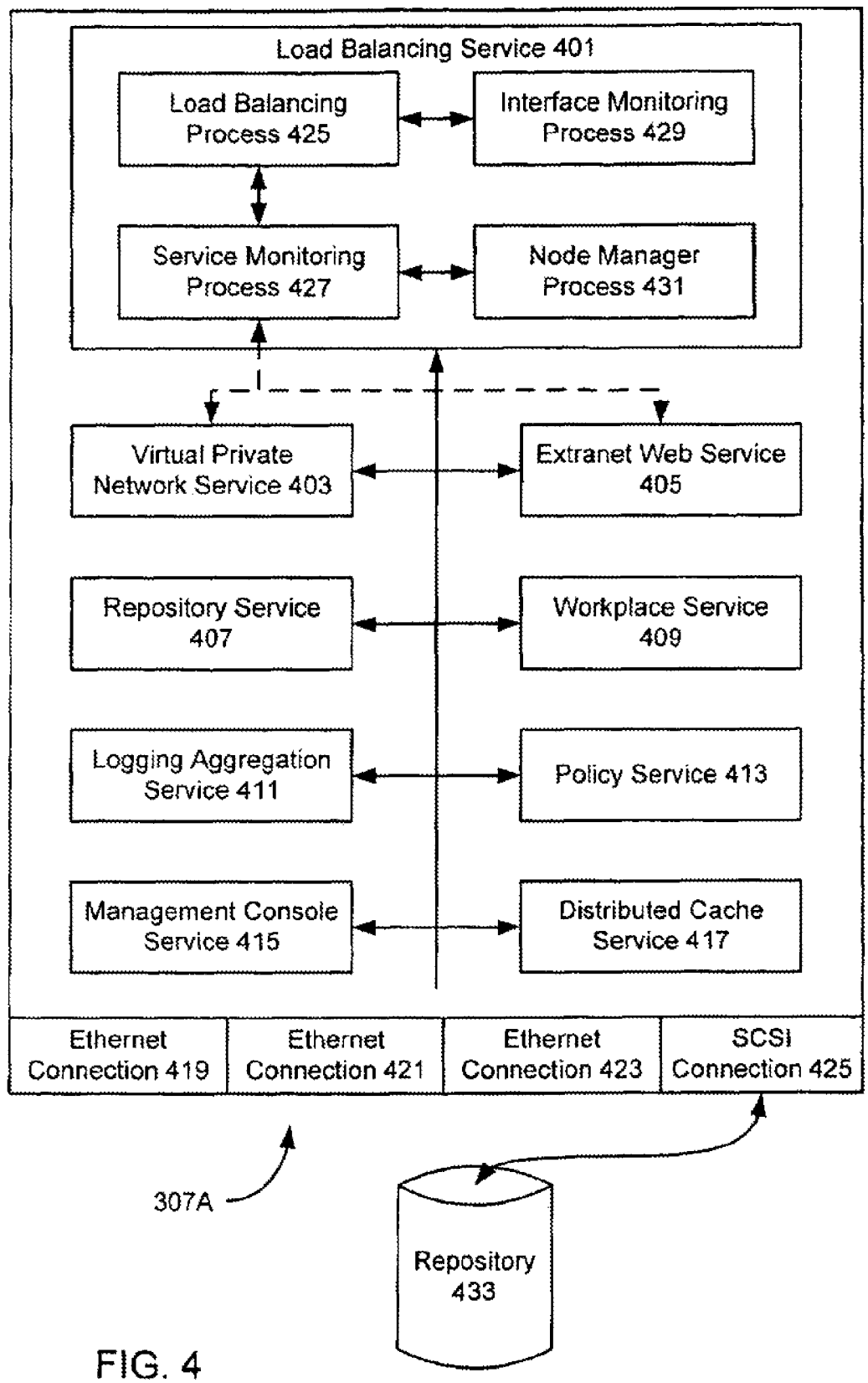
FIG. 4 shows the components of a network appliance according to various examples of the invention.

FIG. 4 illustrates a network appliance 307A in greater detail. As shown this Figure, the network appliance 307A includes a plurality of software services for providing one or more services to a client computer. More particularly, the network appliance 307A provides a load balancing service 401 and one or more platform services. With the illustrated embodiment, the platform hosted by the network appliance 307A provides secure access to the Intranet 105. Accordingly, the platform services may include one or more access method services for securely accessing the Intranet 105. For example, with the illustrated embodiment, the network appliance 307A provides a virtual private network service 403 and an extranet Web service 405.

One or more of the other platform services may then be used to support, enhance or even work through the access method services. Thus, the network appliance 307A also includes a repository service 407, a workplace service 409, a logging aggregation service 411, a policy service 413, an administrative management console service 415, and a distributed cache service 417. Each of these platform services will be explained in more detail below.

With the illustrated embodiment, the network appliance 307 is connected to other devices through three Ethernet connections 419-425 and a SCSI connection 425. More particularly, the Ethernet connection 419 is employed to exchange data with the switch 309, while the Ethernet connection 421 is employed to communicate with the switch 305. The Ethernet connection 423 is then used to communicate with other network appliances 307 (such as the network appliances 307B) over the backplane 313. Accordingly, each of these platform services 403-417 listens for communications over the backplane 313, an internal communication bus within the network appliance 307A, or both. If a platform service listens for communications over the backplane 313, it responds to communications referencing an address for, e.g., the network interface card (NIC) providing the Ethernet connection 423. The SCSI connection 425 is used to transmit data to and receive data from the repository 433, which stores data for the repository service 407. It should be appreciated, however, that alternate embodiments of the network appliances 307 may employ alternate arrangements or types of connections. For example, the ordering of the Ethernet connections 419-423 may be changed such that, e.g., Ethernet connection 421 communicates over the backplane 313 rather than with the switch 305. Also, the SCSI connection 425 may instead be implemented using an IDE connection or other desired type of connection. Still further, different embodiments of the invention may employ more or fewer connections for communicating with other components.

With the illustrated embodiment, the network appliance 307B provides the same platform services 403-417 discussed above. Accordingly, in the following discussion, any reference to a platform service 403-417 unless otherwise specifically noted is applicable to the implementation of that platform service on each network appliance 307. With alternate embodiments of the invention, however, both the network appliance 307A and 307B may provide alternate or additional platform services. For example, with some embodiments of the invention, the network appliance 307A may not provide the virtual private network service 403, while the network appliance 307B may not provide the extranet Web service 405. Discussing the platform services 403-417 in more detail, the virtual private network service 403 allows a client computer to act as a node of the Intranet 105 using an encryption technique such as, for example, the SSL encryption technique. The extranet Web service 405 similarly allows a client computer to securely access the Intranet 105 through a browser using an encryption technique. Various examples of such encryption techniques that may be employed by either the virtual private network service 403 or the extranet Web service 405 are described in U.S. patent application Ser. No. 09/782,593, entitled "Method And Apparatus For Providing Secure Streaming Data Transmission Facilities Using Unreliable Protocols" filed on Feb. 12, 2001 and naming Marc van Heyningen as inventor, and U.S. patent application Ser. No. 09/783,146, entitled "Method And Apparatus For Providing Secure Streaming Data Transmission Facilities Using Unreliable Protocols" filed on Feb. 13, 2001 and naming Marc van Heyningen and Rodger Erickson as inventors, each of which is incorporated entirely herein by reference. Of course, still other encryption techniques and mechanisms may be used to implement the virtual private network service 403, the extranet Web service 405, or both.

The repository service 407 stores information in and retrieves information from the repository 433. The repository service 407 may be used to store a variety of different types of information that may be used by other platform services or by a client computer. For example, the repository service 407 may be used to stored local authentication information, such as user names, passwords, and digital certificates.

The repository service 407 may also be used to store user personal profile information, such as user names, single sign-on credentials for intranet servers, bookmarks and the like. The repository service 407 may be implemented using, e.g., a directory employing the Lightweight Directory Access Protocol (LDAP) or other protocol for managing a database.

The workplace service 409 is a portal service that may be used to augment the features of the virtual private network service 403, the extranet Web service 405, or both. For example, the workplace service 409 may provide Web file access proxy services for the extranet Web service 405 and personal profile bookmarks for users of various client computers. The workplace service 409 may also provide links, such as hypertext links provided by a corporate or other institutional entity, to resources authorized for remote access.

As will be appreciated by those of ordinary skill in the art, each network appliance 307 typically will generate activity information during its operation. This activity information may include, for example, messages indicating when and/or why an activity is begun, messages indicating when and/or why an activity is ended, and messages indicating when and/or why an error in performing an activity has occurred. The logging aggregation service 411 stores this activity information for later by, e.g., a network administrator or other person responsible for maintaining the network 301. With some embodiments of the invention, the logging aggregation service 411 for each network appliance 307 records the activity information for every network appliance 307 in the network 301. Of course, with alternate embodiments of the invention, the logging aggregation service 411 may store only the activity information relevant to its network appliance 307.

The policy service 413 administers policy rules for user of the client computers. For example, the policy service 413 may administer rules determining access to Web sites or other locations within the Intranet 105. As will be discussed in more detail below, the administrative management console service 415 is used to configure the topology of the network 301, and to setup and maintain the services on the network appliances 307A and 307B. The administrative management console service 415 may, for example, be used to configure the policy rules administered by the policy service 413. With various embodiments of the invention, the administrative management console service 415 may configure the policy rules in such a manner that the policy service 413 on each network appliance 307 share a common set of rules. By sharing a common set of policy rules, the network 301 can continue to enforce the desired policy rules even if one of the network appliances 307 fails.

The distributed cache service 417 also maintains a cache of data that is available to each network appliance 307. More particularly, the distributed cache service 417 monitors and records various pieces of information employed by its hosting network appliance 307. The distributed cache service 417 then forwards this recorded information to the distributed cache services 417 of other network appliances 307, for use in the event that its hosting network appliance 307 fails. The distributed cache service 417 thus allows a task being performed by a platform service on one network appliance 307 to fail over to a corresponding platform service on another network appliance 307.

For example, the distributed cache service 417 of the network appliance 307A may record the client authentication and encryption information for each encryption session provided by the virtual private network service 403 on the network appliance 307A. The distributed cache service 417 of the network appliance 307A will then forward that information to the distributed cache service 417 of the network appliance 307B. If the virtual private network service 403 on the network appliance 307A fails during an encryption session, then all future communications relating to that session will be handled by the virtual private network service 403 on the network appliance 307B. Using the shared client authentication and encryption information for the encryption session, the virtual private network service 403 on the network appliance 307B can establish a new encryption session without requiring that the client computer resubmit its authentication information and obtain a new encryption key.

It should be appreciated that various embodiments of the invention may cache different types of information. For example, with some embodiments of the invention, the distributed cache service 417 may record and distribute only authentication information, encryption key information and other encryption session information necessary to allow a client computer to establish a new encryption session through another platform service without having to reauthenticate itself. With other embodiments of the invention, however, the distributed cache service 417 may record and distribute enough state information to allow another platform service to assume administration of an existing encryption session or execution of another software application without interruption.

Still further, for some embodiments of the invention, the distributed cache service 417 may record and distribute different types of information based upon individual users of the client computers. Thus, the distributed cache service 417 may store detailed state information for users employing one type of client computer (e.g., client computers within a corporate network), but only store and distribute authentication information for users employing another type of client computer (e.g., client computer located outside of the corporate network). With various embodiments of the invention, the amount and type of cached and distributed data may be determined by, for example, an administrator for the network 301 in advance, by a user of the client computer, by a software application employing the network appliance 307, or any combination thereof. Examples of distributed cache services that may be employed by various embodiments of the invention are described in U.S. patent application Ser. No. 09/783, 147 entitled "Distributed Cache For State Transfer Operations" filed on Feb. 13, 2001, and naming Rodger D. Erickson as inventor, which application is incorporated entirely herein by reference.

With the illustrated embodiment, only a single load balancing service 401 will be active at any time. Thus, if the load balancing service 401 provided by the network appliance 307A is designated the primary load balancing service, then the load balancing service 401 provided by the network appliance 307B will serve as a secondary or "standby" load balancing service, and will operate only when the load balancing service 401 of the network appliance 307A fails. If the primary load balancing service 401 does fail, the secondary load balancing service 401 can employ the shared information maintained by the administrative management console service 415 to redirect client communications without interruption in service.

This arrangement between a primary load balancing service 401 and a standby load balancing service 401 may be implemented using a virtual Internet protocol (VIP) address and a virtual media access control (VMAC) address. More particularly, a communication to the switches 305 and 309 will reference both a virtual Internet protocol address and a virtual media access control address, which are not associated with a particular network appliance 307. The switch 305 or 309 receiving the communication will route the communication to the access server 307 hosting the primary load balancing service 401, which owns both the virtual Internet protocol address and the virtual media access control address. Thus, designating the virtual media access control address for the network appliance 307 hosting the primary load balancing service 401 as the real media access control address ensures that the switch 305 or 309 will routes the communication to that network appliance 307. Accordingly, the primary load balancing service 401 acts upon the received communication, and directs it to the appropriate platform service. Likewise, the standby load balancing service 401 will not act upon the communication. As will be discussed in more detail below, if the primary load balancing service 401 fails, then the secondary or backup load balancing service 401 can take over ownership of the virtual media access control address and assume the responsibility of load balancing incoming communications. This arrangement allowing for a switch or "failover" of the load balancing responsibilities from a primary load balancing service 401 to a secondary load balancing service 401 is referred to as an "active/standby" configuration. This configuration supports the high availability of the load balancing functions on the network 301 when interruptions occur to the network appliance 307 hosting the primary load balancing service 401.

In the network 301, both the virtual private network service 403 and the extranet Web service 405 will generate an encryption "session" for related communications from a client computer. The network appliance 307 may employ the virtual Internet protocol address and the session identifier to accurately route a communication to the access method service hosting the associated encryption session. When a load balancing service 401 receives a communication, it checks the communication for a session identifier. If the communication includes a session identifier, then the load balancer 401 uses a lookup table to associate that session identifier with the actual Internet protocol address for the access method service 403 or 405 hosting the corresponding encryption session. The load balancing service 401 can then execute a network address translation that translates the virtual Internet protocol address into the actual Internet protocol address for the access method service 403 or 405 hosting the session. If the communication does not include a session identifier, then the load balancing service 401 will route the communication to any appropriate access method service 403 or 405 based upon its load balancing algorithm.

Unlike the load balancing services 401, with the illustrated embodiment both the platform services 403-417 on the network appliance 307A and the platform services 403-417 on the network appliance 307B will typically always be active. That is, the platform services 403-417 on both network appliances 307 will concurrently process incoming communications from client computers. Accordingly, the primary load balancing service 401 will route new client communications to both the platform services 403-417 provided by its own network appliance 307 and the platform services 403-417 provided by the other network appliance 307. Thus, even if the primary load balancing service 401 is hosted by the network appliance 307A, it may direct client communications to one or more working platform services 403-417 provided by the network appliance 307B. The concurrent operation of platform services 403-417 on one or more network appliances 307 is referred to as an "active/active" configuration.

The Load Balancing Service

Referring to the load balancing service 401 in more detail, this service includes a load balancing process 425, a service monitoring process 427, an interface monitoring process 429, and a node management process 431. As will be discussed in more detail below, the service monitoring process 427 and the node management process 431 cooperate together to monitor the status of the platform services 403-417 on both the network appliance 307A and the network appliance 307B. The interface monitoring process 429 monitors for critical systems failures of devices in the network 301 or failures in the network 301 itself. Thus, the interface monitoring process 429 monitors the status of the interfaces and connections that the network appliance 307A employs to exchange data with other devices, including the backplane connection 313 connecting the network appliance 307A and the network appliance 307B. The load balancing process 425 then directs incoming client communications to platform services based upon the status information provided by the service monitoring process 427, the interface monitoring process 429, and the node management process 431.

The load balancing process 425 may be implemented using, for example, the ipvsadm ("IP load balancing administration module") from the Linux Load balancing project. Of course, products and mechanisms, including other server products, may be employed with alternate embodiments of the invention. The load balancing process 425 may employ any desired technique to direct new client communications to the platform services 403-417. For example, the load balancing process 425 may employ the round-robin technique to direct new client communications. According to this technique, new communications are directed to the appropriate working platform services 403-417 based upon their order in a list. Alternately, the load balancing process 425 may employ the weighted least connection technique to direct new client communications. With the weighted least connection technique, the load balancing process 425 directs new client communications to working platform services 403-417 based upon the number of communications already being processed by each service.

It should be noted that, if a client communication includes data associated with a particular platform service 403-417, then the load balancing process 425 will direct the client communication to that platform service. For example, as will be discussed in more detail below, the load balancing process 425 may determine what service is being requested by the communication. Thus, if the client communication is requesting the use of the virtual private network service 403 hosted by the network appliance 307B, then the load balancing process 425 will direct the client communication to that virtual private network service 403 (even if the primary load balancing service 401 is hosted by the network appliance 307A). When a client communication is associated with a platform service that has failed, then the load balancing process 425 will redirect the communication to a corresponding platform service that is working. The new platform service can then employ the shared information from the distributed cache service 417 to process the client communication.

As previously noted, the load balancing process 425 directs incoming client communications based upon the status of the platform services 403-417 on both network appliances 307 and the status of the interfaces and connections linking the network appliances 307. In the illustrated embodiment, both the primary load balancing service 401 and one or more secondary load balancing services 401 may simultaneously monitor the status of the platform services, interfaces and connections.

This arrangement allows the secondary load balancing services 401 to quickly assume the load balancing function if the primary load balancing service fails. With alternate embodiments of the invention, however, only the load balancing service 401 that is acting as the primary load balancing service may monitor the status of the platform services, interfaces and connections.

The node management process 431 determines whether a platform service initially has started properly, or has restarted properly after a failure by verifying that the service is running in memory. When a process starts, it can be identified in memory by a Process Identification number (PID number) listed in a process table which is recorded in a file stored in a specified location. One method for verifying that a process is running in memory is to verify that the PID file has been created and use the information stored in the PID file to identify the processes in the process table, thus verifying that these processes are running in memory. Periodically, the node management process 431 checks for a PID in the PID file corresponding to each platform service. If the node management process 431 does not find a PID corresponding to a particular service, or cannot identify the process in memory using the information stored within the PID file, then the node management process 431 informs the service monitoring process 427 that the platform service has failed to start (or restart) properly.

In the illustrated embodiment, the node management process 431 checks the PID file only for PIDs corresponding to local platform services. That is, the node management process 431 on the network appliance 307A will only check for PID files corresponding to platform services hosted on the network appliance 307A, while the node management process 431 on the network appliance 307B will only check for PID files corresponding to platform services hosted on the network appliance 307B. With alternate embodiments of the invention, however, the node management process 431 may share its platform service status with every network appliance 307 in a network.

With the illustrated embodiment, the service monitoring process 427 of the primary load balancing service 401 polls the node management process 431 on each network appliance 307 for the status of its corresponding platform services. With alternate embodiments of invention, however, the node management process 431 on each network appliance 307 may "push" the platform service status information to service monitoring process 427 of the primary load balancing service 401. Still further, with alternate embodiments of the invention, the service monitoring process 427 of the standby load balancing services 401 may also obtain the status information from the node management process 431 on each network appliance 307.

The service monitoring process 427 may be implemented using a software module or "daemon" created with, for example, the Linux or Unix operating system. As previously noted, the service monitoring process 427 gathers reports from the node management process 431 indicating when a platform service has not started or restarted properly. More particularly, the node management process 431 reports the status of each platform service as being "RUNNING," "NOT RUNNING," or "STARTING." If the node manager process 431 reports any status other than "RUNNING," the service monitoring process 427 marks that platform service as being in "HOLD_DOWN" mode, and informs the load balancing process 425 to suspend communications to that platform service.

In addition, the service monitoring process 427 itself checks the status of one or more of the platform services hosted by the network appliances 307. For example, in the illustrated embodiment, the service monitoring process 427 determines whether the access method services (i.e., the virtual private network service 403 and the extranet Web service 405) on each network appliance 307 will accept and process communications. With alternate embodiments of the invention, however, the service monitoring process 427 may monitor the working status of alternate or additional platform services.

In order to check the working status of a platform service on a network appliance 307 (including its own), the service monitoring process 427 may, for example, simply access that platform service. If the platform service is being hosted by a different network appliance 307, then the service monitoring process 427 accesses the platform service through the address of the Ethernet connection 423 for that network appliance 307 over the backplane 313. Similarly, if the platform service is being hosted by the same network appliance 307 as the service monitoring process 427, then the service monitoring process 427 accesses the platform service through the backplane 313 address of the Ethernet connection 423 for its own network appliance 307. The local backplane 313 Internet protocol (IP) address will then traverse an internal route for the access request.

To access a virtual private network service 403, the service monitoring process 427 may attempt to initiate an SSL encryption session with that virtual private network service 403 by transmitting a SOCKS protocol handshake to that virtual private network service 403. If it does not receive a response to the SOCKS handshake from the virtual private network service 403, then the service monitoring process 427 increments a failure counter associated with the virtual private network service 403. If the service monitoring process 427 successfully receives a reply to the SOCKS handshake from the virtual private network service 403, then the service monitoring process 427 resets the failure counter to zero. If the failure counter reaches a threshold value, such as, e.g., a value of three, then the service monitoring process 427 will place the virtual private network service 403 in the "HOLD_DOWN" mode and inform the load balancing process 425 to suspend any further communications to the virtual private network service 403. The service monitoring process 427 will then suspend its service checks of the virtual private network 403 for a preset period of time (e.g., 60 seconds, after which the service monitoring process 427 will resume checking the virtual private network 403.

If the node management process 431 reports the status of the virtual private network service 403 as other than "RUNNING," the service monitoring process 427 suspends all further service checks against the failed virtual private network service 403. The node management process 431 will continue attempts to restart the failed virtual private network service until the service successfully starts and remains running. The load balancing process 425 will continue to suspend any network traffic to the failed virtual private network service 403 (by, for example, setting a status flag associated with the service) until it is instructed by the service monitoring process 427 that the virtual private network service 403 is once again available to accept communications, as will be described below. Communications requiring the virtual private network service 403 will be directed to another network appliance 307 having a working virtual private network service 403. The existing communication connections to the failed virtual private network service 403 are then allowed to close on their own accord.

Even after a virtual private network service 403 has failed, the node management process 431 will continue to monitor the status of the failed virtual private network service 403. If the virtual private network service 403 successfully restarts (creating a new PID in the PID file), the node management process 431 will register the restart of the service and report a status of "RUNNING" to the service monitoring process 427 when it next polls the node management process 431 for status information. The service monitoring process 427, will then place the virtual private network service 403 in the "HOLD_DOWN" mode, and resume checking the status of the virtual private network service 403 after the preset time period has expired. If the service monitoring process 427 then can initiate three successful SOCKS handshakes with the restarted virtual private network service 403, the service monitoring process 427 will remove the "HOLD_DOWN" mode status associated with the private virtual network service 403 and thereby allow the load balancing process 425 to begin forwarding communications to the virtual private network service 403 again.

In a similar manner, the service monitoring process 427 may access the extranet Web service 405 by, for example, sending it a simple network request (such as, e.g., a HTTP GETrequest). If the request is not successfully answered, then the service monitoring process 427 increments a failure counter associated with that extranet Web service 405. If the service monitoring process 427 successfully receives a response to its request, then the service monitoring process 427 resets the failure counter to zero. If the failure counter reaches a threshold value, such as, e.g., a value of three, then the service monitoring process 427 will place the extranet Web service 405 in the "HOLD_DOWN" mode as described above, and resume checking the status of the extranet Web service 405 after the preset period has expired.

As with the virtual private network service 403, if the node management process 431 reports the status of the extranet Web service 405 as other than "RUNNING," the service monitoring process 427 suspends all further service checks against the failed extranet Web service 405. The node management process 431 will continue attempts to restart the failed extranet Web service 405 until the service successfully starts and remains running. The load balancing process 425 will then continue to suspend any network traffic to the failed extranet Web service 405, until it is instructed by the service monitoring process 427 that the extranet Web service 405 is once again available to accept communications. Instead, any client communications requiring the extranet Web service 405 will be routed to another network appliance having a working extranet Web service 405, and the existing communication connections to the failed extranet Web service 405 are then allowed to close on their own accord.

Again, even after an extranet Web service 405 has failed, the node management process 431 and the service monitoring process 427 will continue to monitor its status. If the extranet Web service 405 successfully restarts (creating a new PID in the PID file), the node management process 431 will register the restart of the service and report a status of "RUNNING" to the service monitoring process 427 when it next polls the node management process 431 for status information. The service monitoring process 427 will then place the extranet Web service 405 in the "HOLD_DOWN" mode, and resume checking the status of the extranet Web service 405 after the preset time period has expired. If the service monitoring process 427 then receives three successful replies to its requests from the restarted extranet Web service 405, then the service monitoring process 427 will remove the "HOLD_DOWN" mode status associated with the private virtual network service 403 and thereby allow the load balancing process 425 to begin forwarding communications to the extranet Web service 405 again.

While it is not expressly shown in FIG. 4, the service monitoring process 427 in the primary load balancing service 401 will check the status of platform services on all of the available network appliances 307, as previously noted. Thus, if the network appliance 307A hosts the primary load balancing service 401, its service monitoring process 427 will check the status of platform services on both the network appliance 307A and the network appliance 307B. Further, the service monitoring process 427 will poll the node management process 431 on both the network appliance 307A and the network appliance 307B.

Advantageously, the service monitoring process 427 can monitor the status of the platform services on its own network appliance 307 through interprocess communications. Such interprocess communications may be, for example, a COM call on a network appliance 307 employing the Microsoft Windows operating system, a pipeline on a network appliance 307 employing the Unix operating system, through local sockets or the like. Thus, the service monitoring process 427 can determine the status of platform services on its own network appliance 307 much faster than if it was required to check the status through a switching device. Similarly, the service monitoring process 427 can monitor the status of the platform services hosted by other network appliances 307 at a very high speed through the backplane 313.

It should be noted, however, that alternate embodiments of the invention may employ different arrangements for monitoring the status of the platform services. For example, with some embodiments of the invention, the node management process 431 of the primary load balancing service 401 may check obtain status information from corresponding node management processes 431 on all of the available network appliances 307, as previous noted. Alternately, the service monitoring process 427 on each network appliance 307 may monitor the status of only local platform services, and then report the status back to the service monitoring process 427 (or the load balancing process 425) for the primary load balancing service 401. Also, in the illustrated embodiment, only the service monitoring process 427 of the primary load balancing service 401 monitors the status of the platform services on the network appliances 307. With alternate embodiments of the invention, however, the service monitoring process 427 of one or more secondary load balancing services 401 may monitor the status of the platform services on the network appliances 307. This allows a secondary load balancing service 401 to quickly assume the responsibility for load balancing if the primary load balancing service 401 fails.

As previously noted, the interface monitoring process 429 monitors for critical systems failures in the network 301. That is, the interface monitoring process 429 monitors the network for failures in individual devices, such as might result from the failure of a power supply, a hard drive, a main board, a processor, a memory module or a network interface card. With the illustrated embodiment, the interface monitoring process 429 for each network appliance 307 actively monitors for critical system failures. Accordingly, even the interface monitoring process 429 of a load balancing service 401 acting as a secondary load balancing service will check for critical system failures. If it detects a critical system failure, the interface monitoring process 429 reports the failure to the service monitoring process 427, which then relays this information to the load balancing process 425.

The interface monitoring process 429 monitors the interfaces and connections employed by its own network appliance 307. For example, the interface monitoring process 429 may periodically transmit a spanning tree protocol request to the switches 305 and 309 (and, if applicable, to a switch employed on the backplane 313) through each of the Ethernet connections 419-423 of its network appliance 307. As known in this art, this type of message asks the switch corresponding to the connection to identify the root of the spanning tree. If no reply is received over one of the connections, then the interface monitoring process 429 will determine that the connection has failed (e.g., that the network interface connection (NIC) card associated with the connection has failed). It then informs the load balancing process 425 of the failed connection.

The interface monitoring process 429 also sends periodic "heartbeat" messages to the other network appliances 307 through each of the Ethernet connections 419-423 of its network appliance 307, and monitors these Ethernet connections 419-423 for replies to these heartbeat messages (or, alternately, for similar heartbeat messages from other network appliances 307). If the interface monitoring process 429 determines that it has not received such a message from another network appliance 307 with a threshold period of time, then it determines that the other network appliance 307 has suffered a critical failure. By comparing the responses to the spanning tree messages with the replies to the heartbeat messages, the interface monitoring process 429 can distinguish between a failure associated with its own network appliance 307 and a failure associated with another network appliance 307.

If the interface monitoring process 429 of the primary load balancing service 401 determines that a connection on its own network appliance 307 has failed, then that load balancing service 401 removes itself as the primary load balancing service. For example, with various embodiments of the invention, it may attempt to inform the load balancing services 401 of other network appliances 307 that it is resigning as the primary load balancing service. As previously noted, the switches 305 and 309 deliver communications to the primary load balancer 401 by mapping the primary load balancer 401 to the port corresponding to the virtual media access control address in the communication. Still further, the resigning primary load balancing service 401 will discontinue responding to communications using the virtual Internet-protocol address also described above.

On the other hand, if the interface monitoring service 429 of a standby load balancing service 401 determines that the primary load balancing service 401 has failed, then that backup load balancing service 401 may proactively attempt to assume the role of the primary load balancing service. For example, the network 301 illustrated in FIG. 3 includes only two network appliances 307. If the primary load balancing service 401 fails, then the standby load balancing service 401 must assume the load balancing functions for the network 301 to continue to operate properly. With some embodiments of the invention, if the standby load balancing service 401 does choose to become the primary load balancing service, then it may attempt to notify the existing primary load balancing service 401 of its intentions. Further, it may attempt to have the switches 305 and 309 port map the virtual media access control address to its network appliance 307. Additionally, the backup load balancing service 401 will thereafter respond to communications using the virtual Internet protocol address. In this manner, the interface monitoring service 429 allows a backup load balancing service 401 to assume the primary load balancing responsibilities when the primary load balancing service 401 fails.

It should be noted that, while the service monitoring process 427, the interface monitoring process 429 and the node management process 431 have been described as separate processes, alternate embodiments of the invention may combine two or more of these processes into a single monitoring process. For example, some embodiments of the invention may employ a single unified monitoring process to start and stop platform services, check PID files for PID numbers corresponding to platform services, check the status of the platform services on each network appliance 307 in a network, and monitor the status of connections and other system failure problems in a network.

Virtual Network Address Multiplexing

As will be appreciated by those of ordinary skill in the art, a communication using the Transmission Control Protocol/Internet Protocol (TCP/IP) has four pieces of information: an originating address, an originating port, a receiving address, and a receiving port. Moreover, various conventions have become commonplace for using these protocols.

For example, communications using the unsecured hypertext transfer protocol (HTTP) are typically received at (and thus sent to) port number 80, while communications using the secure hypertext transfer protocol (HTTPS) are typically received at (and thus sent to) port number 443, and communications using the SOCKS protocol are typically received at (and thus sent to) port number 1080. Thus, according to convention, both the virtual private network service 403 and the extranet Web service 405 of a network appliance 307 should listen for communications at port 443. The virtual private network service 403 and the extranet Web service 405 then normally cannot both share a single Internet protocol address, however. Accordingly, various embodiments of the invention may provide a separate Internet protocol address for each of the virtual private network service 403 and the extranet Web service 405, with each address still using port 443. While these embodiments allow the virtual private network service 403 and the extranet Web service 405 to both properly receive communications through port 443, this arrangement requires the administrator of the network 301 to provide the necessary extra Internet protocol addresses, which may be expensive or time consuming.

Accordingly, various embodiments of the invention employ port multiplexing to allow both the virtual private network service 403 and the extranet Web service 405 to receive communications through a single Internet protocol address and port number. With port multiplexing, the primary load balancing service 401 examines each incoming communication to determine which platform service should receive the communication. For example, if the incoming communication should be processed by a virtual private network service 403, then the communication will include a virtual private network protocol frame embedded in the payload data contained in the communication (e.g., the data originally intended to be transmitted by the client computer). On the other hand, if the incoming communication should be processed by an extranet Web service 405, then it will include a SSL "helo" message embedded in the payload data contained in the communication.

After it determines the type of incoming communication, the primary load balancing service 401 directs the communication to the appropriate platform service. Further, the primary load balancing service 401 continues to act as an intermediary between the source of the incoming communication. More particularly, the primary load balancing service 401 forwards data packets in the communication to the appropriate platform service, and then relays that service's reply data packets back to the source of the communication.

Figure 1:
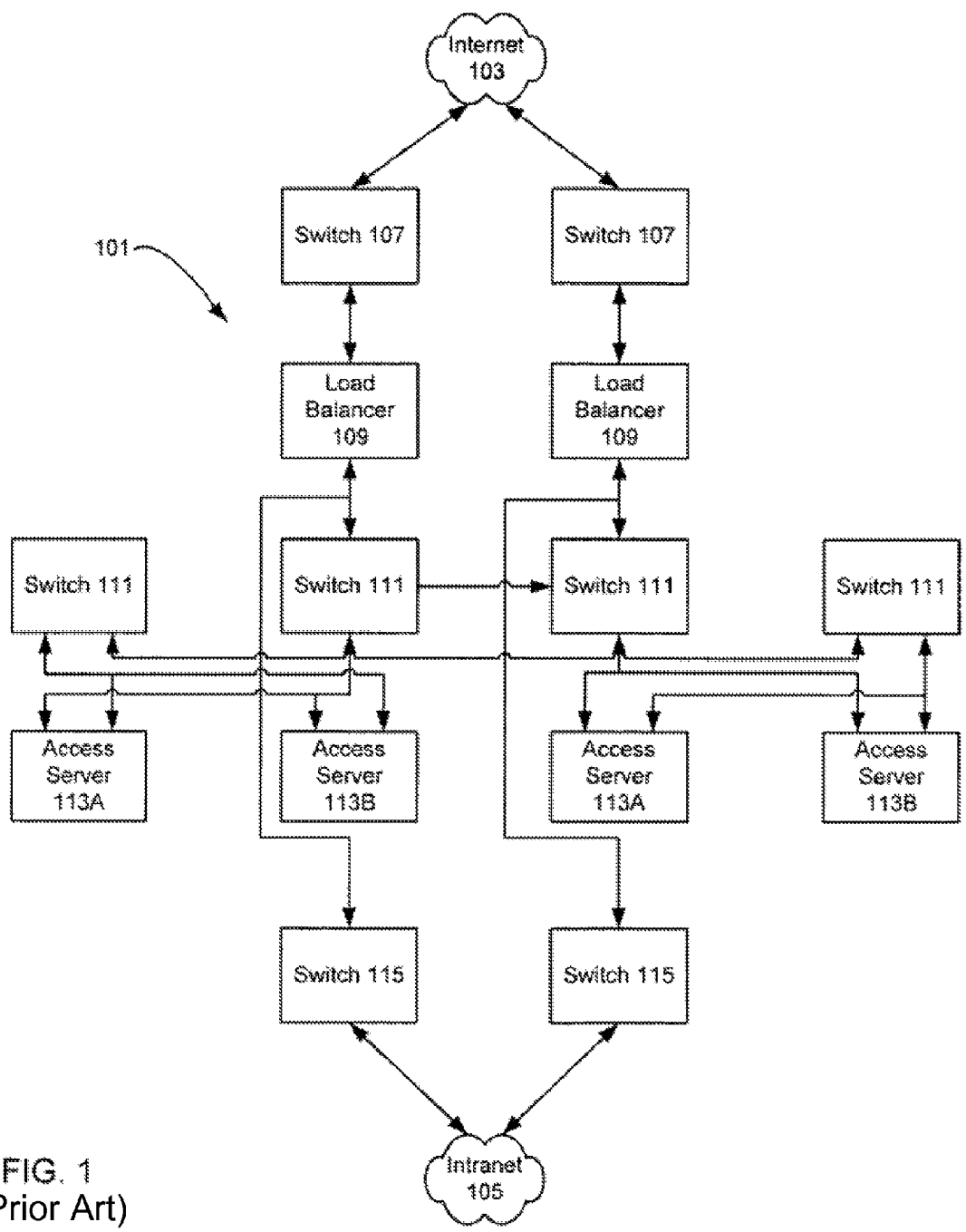
FIG. 1 shows one example of a conventional network.
Figure 5A:
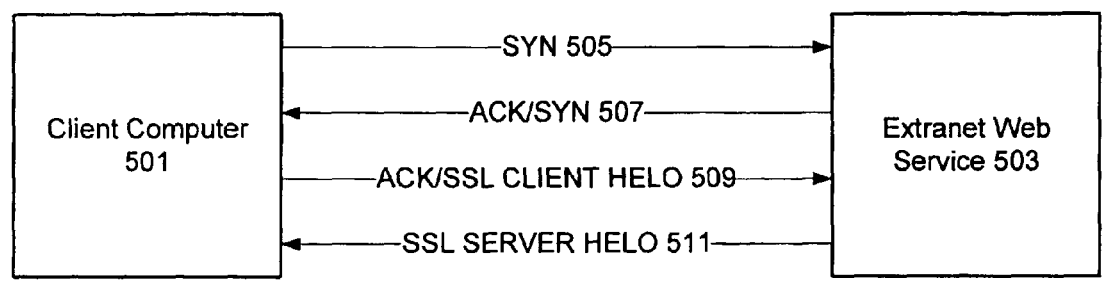
FIGS. 5A and 5B together illustrate an example of port multiplexing according to various embodiments of the invention.

FIG. 5A illustrates how a client computer 501 communicates with an extranet Web service 503 in a conventional network, such as the network 101 shown in FIG. 1. Initially, the client computer 501 transmits a SYN message 505 as the initial portion of the communication. The extranet Web service 503 then acknowledges the SYN message with an ACK/SYN message 507 in reply. Next, the client computer 501 sends the TCP ACK and CLIENT SSL HELO message 509 to the extranet Web service 503, and the extranet Web service 503 replies with the SERVER SSL HELO message 511. From this point, the client computer 501 and the extranet Web service 503 continue to exchange messages to complete the communication in a conventional fashion. As will be appreciated by those of ordinary skill in the art, each of the messages described above will be made up of one or more data packets. Further, with the Transmission Control Protocol/Internet Protocol, each of the data packets will be sequentially numbered, so that both the client computer 501 and the extranet Web service 503 can detect when a data packet has been lost.

Figure 5B:
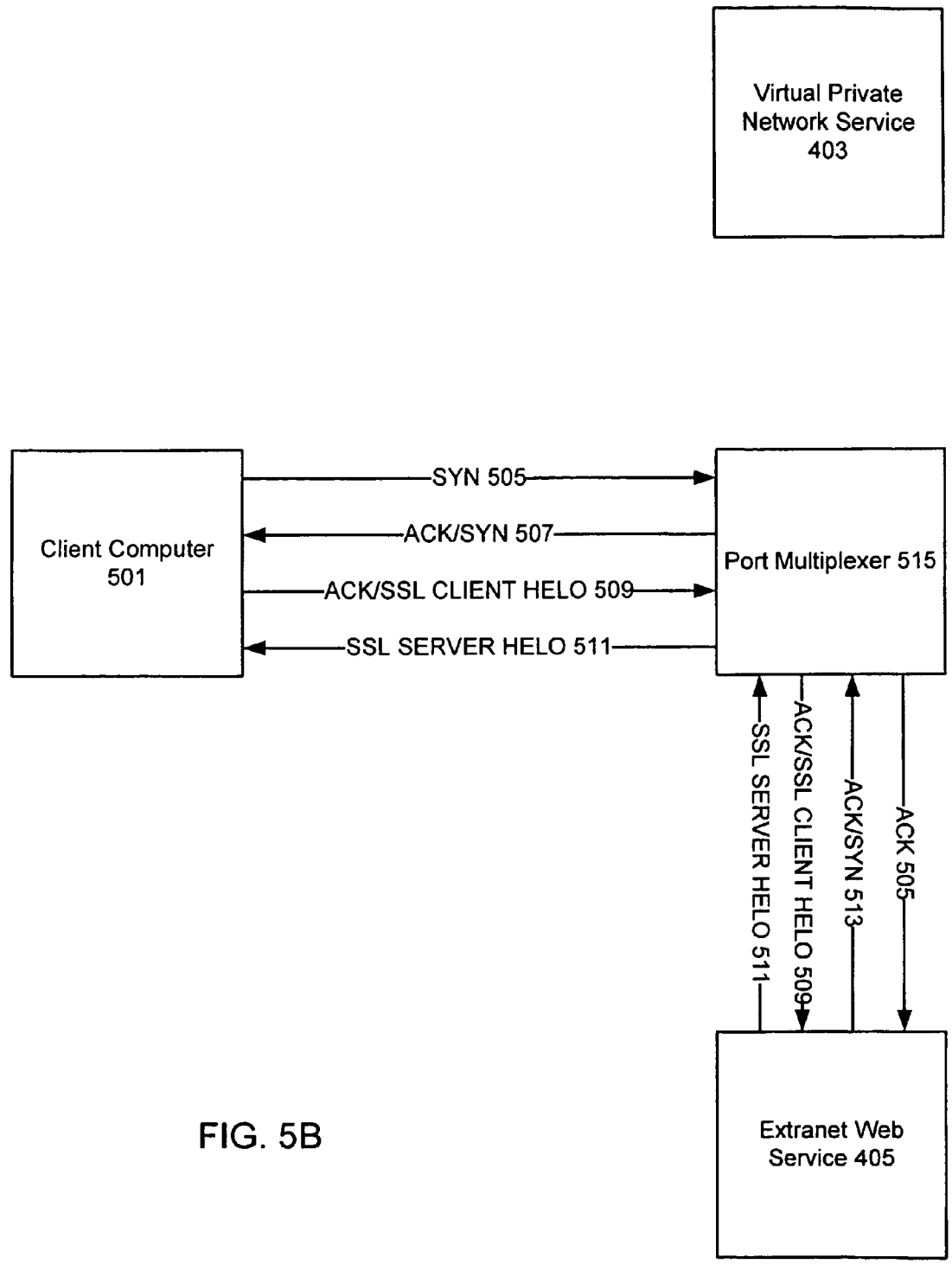

FIG. 5B illustrates how the port multiplexing operation employed by various embodiments of the invention operates in comparison. Again, the client computer 501 initially transmits a SYN message 505 as the initial portion of the communication. In this instance, however, the client computer 501 initially transmits the SYN message 505 to the port multiplexer 515 rather than directly to the extranet Web service 405.

The port multiplexer 515 replies to the SYN message 505 from the extranet Web service 405 with its own ACK/SYN 507 message. Next, the client computer 501 sends the CLIENT SSL HELO message 509 to the load balancing service 401 (illustrated as port multiplexer 515). By recognizing this message 509 as a CLIENT SSL HELO message, the port multiplexer 515 determines that the client communication is intended for the extranet Web service 405 rather than the virtual private network service 403. Accordingly, the port multiplexer 515 forwards the CLIENT SSL HELO message 509 to the extranet Web service 405. The extranet Web service 405 then replies with the SERVER SSL HELO message 511, which is relayed by the extranet Web service 405 to the client computer 501. From this point, the client computer 501 and the extranet Web service 405 continue to relay messages through the port multiplexer 515 to complete the communication.

As with the conventional communication, each of the messages making up the communication from the client computer 501 to the extranet Web service 405 is made up of one or more sequentially-numbered data packets. The numbering of the data packets exchanged between the client computer 501 and the port multiplexer 515 will be different, however, than the number of the data packets exchanged between the port multiplexer 515 and the extranet Web service 405. Accordingly, the port multiplexer 515 tracks the sequence numbers in both sets of data packets, and modifies them so that the extranet Web service 405 will recognize the sequence numbers of the data packets relayed from the client computer 501 and the client computer 501 will recognize the sequence numbers of the data packets relayed from the extranet Web service 405. It should also be noted that, while the above example illustrated a communication intended for the extranet Web service 405, the same process is employed to deliver communications to the virtual private network service 403 as well.

Because the port multiplexer 515 relays communications to both the virtual private network service 403 and the extranet Web service 405, all three services may share a single Internet protocol address. For example, the port multiplexer 515 may receive communications directed an Internet protocol address at a first port number. The virtual private network service 403 may then receive communications directed to the same Internet protocol address, but at a different port number. Still further, the extranet Web service 405 may then receive communications directed to the same Internet protocol address but at yet another port number. Advantageously, the port number for the port multiplexer 515 may be set to port number 443, so that the port multiplexer 515 receives all communications directed to the network 301 intended for a secure platform service. The port numbers for the virtual private network service 403 and the extranet Web service 405 can then be set to any desired port number.

Administrative Management Console

Turning now to the administrative management console service 415, this service may be used to configure. the topology of the network 301 and to setup and maintain the client and load balancing services on the network appliances 307. For example, the administrative management console service 415 may be used to set user permissions, identify and allocate network resources, and assign authentication information and access rights to individuals and groups. With various embodiments of the invention, the administrative management console service 415 may also allow, for example, a network administrator to configure the topology of the network 301, and to inspect and modify the network topology in the event of device or services failures. Still further, the administrative management console service 415 can be used to configure and maintain user credentials and policy rules, as previously discussed.

With various embodiments of the invention, the network appliances 307 are organized into managed clusters, which share a common set of policy rules and configuration, as well as the necessary service control behavior to enable replication of the policy rules and configuration on each network appliance 307. Each cluster will have a master node, which acts as the primary controller for the managed cluster. For example, the administrative management console service 415 for the master network appliance 307 is responsible for introducing changes to the policy rules and configuration replicated on all of the network appliances 307 of the cluster. This administrative management console service 415 may, for example, replicate a "unified configuration," which contains all of the configuration information for the cluster, on each network appliance 307 for the cluster.

The managed cluster may also have one or more "slave" network appliances 307. A slave network appliance 307 listens for changes in the policy rules or configuration of the managed cluster, and accepts configuration and policy rule changes propagated by the master. In the illustrated embodiment, communication of changes in the configuration and policy rules may be communicated, e.g., over the back plane 313.

With various embodiments of the invention, the initial point of configuration of a network appliance 307 will be through a command line setup tool. The setup tool can be used to provision the network appliance 307 with network information necessary to participate on the network 301, including an Internet protocol address for the network appliance 307. Once provisioned, the person using the setup tool (e.g., the administrator of the network 301) is prompted if the network appliance 307 should be part of a cluster. If so selected, the person using the setup tool is prompted for the name of the cluster the network appliance 307 is to join and a unique network appliance 307 identification that can be used to identify the network appliance 307 in the cluster.

Once the person using the setup tool has indicated that the network appliance 307 is to be part of a cluster and has specified an identifier, the network appliance 307 determines if the backplane 313 for communicating changes among the network appliances 307 in the cluster is present. If it is not, then the added network appliance 307 does not start the communication bus over the backplane 313. The added network appliance 307 can then display a status code or Web page indicating the error.

The selection of a master node for the cluster is done via the administrative management console service 415. All network appliances 307 are initially inserted as slave network appliances 307. A master network appliance 307 then is selected by logging into the administrative management console service 415 of intended master network appliance 307, and selecting that network appliance 307 to be the master network appliance 307. Once a master network appliance 307 has been selected and while that master network appliance 307 is up and running, another network appliance 307 will not be allowed to be promoted to master network appliance 307.

Accordingly, if a person (such as the network administrator) attempts to access the administrative management console service 415 console on a network appliance 307 other than the master network appliance 307, the person may, for example, only receive a message directing them to the master network appliance 307. Initially, the credentials used to access the administrative management console service 415 on each network appliance 307 may be different. Once the master network appliance 307 has been selected, however, it will propagate its credentials to each slave network appliance 307.

With various embodiments of the invention, any network appliance 307 added into the cluster communicates with the master network appliance 307 to verify that the version of software it is provisioned with is equal to the version run by the master network appliance 307. If so, it will receive updates from the master appliance 307.

When a slave network appliance 307 is inserted into a cluster, according to some embodiments of the invention the master network appliance 307 may provision the slave network appliance 307 with an Internet protocol address for the Ethernet connection 421 from a known range of Internet protocol addresses. If the master does not already have IP information for the Ethernet connection 419 for the slave network appliance 307, it will request that information from the slave network appliance 307. The Ethernet connection 419 interface will be configured for every network appliance 307 during setup.

Once the initial Internet protocol address information for a slave network appliance 307 has been established and the slave has been inserted into a cluster using the setup tool, the slave network appliance 307 is provisioned with the configuration data maintained by the master network appliance 307. This configuration may be, for example, a single block of information used by every network appliance 307 in the cluster, and may include information specific to a particular network appliance 307. The integrity of this information may be protected, e.g., via a checksum, which can be delivered with the configuration data. If the network appliance 307 is being used in a dual-homed configuration, an administrator may employ the administrative console service 415 to manually configure the Internet protocol address for the Ethernet connection 421. After a network appliance 307 is provisioned with the configuration data, it can start up the appropriate services that are configured. In a conservative arrangement, the network appliance 307 may not start a service until the network appliance 307 has been provisioned with the configuration data, but alternate embodiments of the invention may allow, for example, a network administrator to select for an earlier start up of one or more services. For the initial configuration of an entire cluster, all slave network appliances 307 may be provisioned once a master in selected, to allow various options for provisioning Internet protocol information across the cluster.

With various embodiments of the invention, network appliances 307 may be manually removed from the cluster with their configuration information remaining intact.

Removal of the configuration information can be performed automatically, however, if so desired. Typically, no action will be taken by the master network appliance 307 when a slave network appliance 307 goes off-line from the cluster. Similarly, a slave network appliance 307 will take no action when the master network appliance 307 goes off-line from the cluster if it has a known, valid configuration (e.g., if it has had a recent successful update of the configuration information). If the slave network appliance 307 does not have a known, valid configuration, then it may terminate the services it provides until it receives valid configuration information.

When a slave network appliance 307 that is already a member of the cluster comes online, a check is made to determine if it possesses the current configuration information. If it does, then no changes are made to the network appliance 307. If it does not have the current configuration information, then the network appliance 307 undergoes initial provisioning as discussed in detail above.

When the master network appliance 307 goes offline, a window of opportunity is opened for another network appliance 307 to assume the role of the master network appliance 307. Without a master network appliance 307, the cluster will act as an initial cluster configuration, and a new master network appliance 307 may be selected via the master promotion process as discussed in more detail below. Accordingly, when the original master network appliance 307 comes back online, it will try to reassert itself as the master network appliance 307. If another network appliance 307 was promoted to master while the original master network appliance 307 was offline, the original master network appliance 307 will not be successful at reasserting itself and will rejoin the cluster as a slave network appliance 307.

The simplest implementation of promoting a slave network appliance 307 to a master network appliance 307 is a manual promotion. This type of promotion may be done, for example, using the administrative management console service 415 of the network appliance 307 being promoted. As previously noted, however, the user interface for the administrative management console service 415 of a slave network appliance 307 (which may be, for example, a page presented in a web browser) will not allow promotion of a slave network appliance 307 to a master network appliance 307 if that slave network-appliance 307 determines that a master network appliance 307 is already present in the cluster.

A network appliance 307 that previously had the role of master may be taken off-line from the cluster inadvertently, and then come back on line. In this situation, the following behavior is expected to occur. First, the original master network appliance 307 comes online and queries the cluster for master ownership. If another network appliance 307 claims to be the master network appliance 307; both network appliances 307 then arbitrate ownership of the master role. This arbitration may be done, for example, via examination of a shared token. The result of the arbitration is that the master network appliance 307 that does not possess the 'current' token demotes itself to a slave network appliance 307.

Various embodiments of the invention may support network appliance 307 upgrades on an individual node basis rather than a centrally managed upgrade mechanism. According to these embodiments, the network may be upgraded by first taking the master network appliance 307 offline and stopping it. The master network appliance 307 can then be upgraded while it is not attached to the cluster. Next, the master network appliance 307 is brought back online, and it automatically takes the slave network appliances 307 offline for upgrading. The slave network appliance 307 may then be upgraded and brought back online.

With various embodiments of the invention, individual settings may be used for controlling access and supporting services on a network appliance 307. Alternately, the configuration of the settings for controlling access and supporting services on each network appliance 307 may be global in scope.

It should be noted that a clustered network appliance 307 has two instances of configuration present at any time. The first instance is the "active" configuration state, which is the configuration currently applied across all network appliances 307 in the cluster. The second instance is the "pending" state, which is the state that will be applied to the network appliance 307 once the master network appliance 307 commits to a synchronization event. This allows a user to set new configuration data but postpone actually implementing that configuration data until desired, for minimal latency in propagation changes.

Advantageously, provisioning of the network appliance 307 can be simplified by delivering the policy and configuration information as one payload. More particularly, (1) the configuration information used during the setup process to configure the operating system and the network configuration, (2) the configuration information employed by the management console, and (3) the configuration information for configuring the access methods (e.g., the virtual private network service 403 and the extranet Web service 405) and the setting up the user policy information can be collected into a single file. With some embodiments, this information can be collected into a single file that uses the extensible markup language (XML). By using the extensible markup language, the combined file can both provide both a database containing the configuration information and the rules for implementing the contents of the database.

Operation of the Dual-Homed Network

Referring back now to FIG. 3, the operation of dual-homed network employing network appliances 307A and 307B will now be explained. Initially, a client communication delivered via the Internet 103 is received by the firewall 303, which passes the communication to the switch 305. As previously noted, the client communication will be directed to the access server 307 owning the virtual Internet protocol address (VIP) and the virtual media access control address. For example, if the load balancing service 401 of the network appliance 307A is the primary load balancing service, then the switch 305 will port map the client communication to the network appliance 307A.

When the network appliance 307 receives the client communication, the primary load balancing service 401 determines where to route the communication. If the client communication does not have an existing association with a particular platform service, then the load balancing service 401 routes the client communication to a suitable platform service. For example, if the client communication is requesting access to the Intranet 105 through the use of a virtual private network, then the primary load balancing service 401 will route the communication to a virtual private network service 403. The virtual private network service 403 will then decrypt the client communication using the key or keys employed by the virtual private network, and add the network address for the Intranet 1105 (or a node within the Intranet 105) to the client communication.

As previously noted, the primary load balancing service 401 may route the communication based upon any desired load balancing algorithm, such as a round robin algorithm or a weighted least connection algorithm. As also previously noted, the primary load balancing service 401 may route the communication to a platform service hosted by its own network appliance 307, or to a platform service hosted by another network appliance 307 through the backplane 313. If the client communication is affiliated with a particular platform service (e.g., the client communication includes a an encryption session identifier for an encryption session hosted by a particular platform service, as explained in detail above), then the primary load balancing service 401 routes the communication to that particular platform service.

When the appropriate platform service receives the client communication, it processes the client communication as requested. After the platform service has processed the client communication, the network appliance 307 hosting the platform service then forwards the processed client communication onto the switch 309. The switch 309 then relays the processed client communication to the firewall 311, which passes the processed client communication onto the Intranet 105. The reply to the client communication is then passed back through the firewall 311 to the switch 309.

After the platform service receiving the reply communication processes the reply communication, it forwards the processed reply communication to the primary load balancing service 401 which in turn performs a network address translation process to provide the reply with a virtual Internet protocol (VIP) address and routes it via switch 305, which passes the processed reply communication to the firewall 303. The firewall 303 then forwards the processed reply communication to the client through the Internet 103.

A Single-Horned Network

Figure 6:
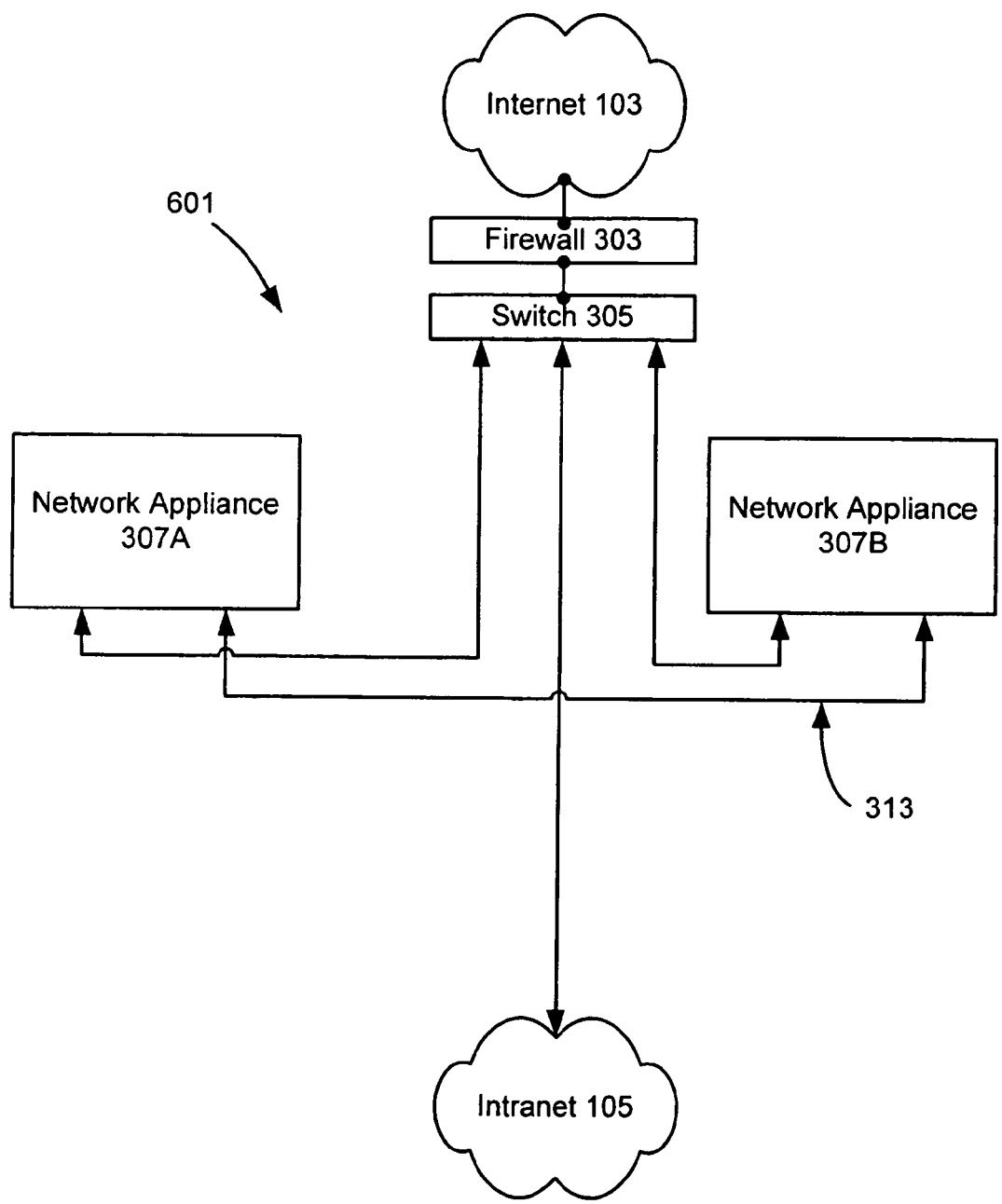
FIG. 6 illustrates an example of a single-homed network according to various embodiments of the invention.

While the network arrangement shown in FIG. 3 is a dual-homed network arrangement, FIG. 6 illustrates a single-homed network using the network appliances 307 according to various embodiments of the invention. This arrangement is referred to as a single-homed network because the network 601 has only a single access point to external networks (i.e., through switch 305). As seen in this Figure, the network 601 includes the firewall 303, the switch 305, and the network appliances 307A and 307B. The single-homed network does not, however, include switch 309 or firewall 311. Thus, instead of relaying a processed client communication directly to the Intranet 105, the network appliance 307 that processed the client communication relays the processed client communication back-through the switch 305. The switch 305 then transmits the processed client communication to the Intranet 105.

Use of N+1 Network Appliances in a Network

Figure 7:
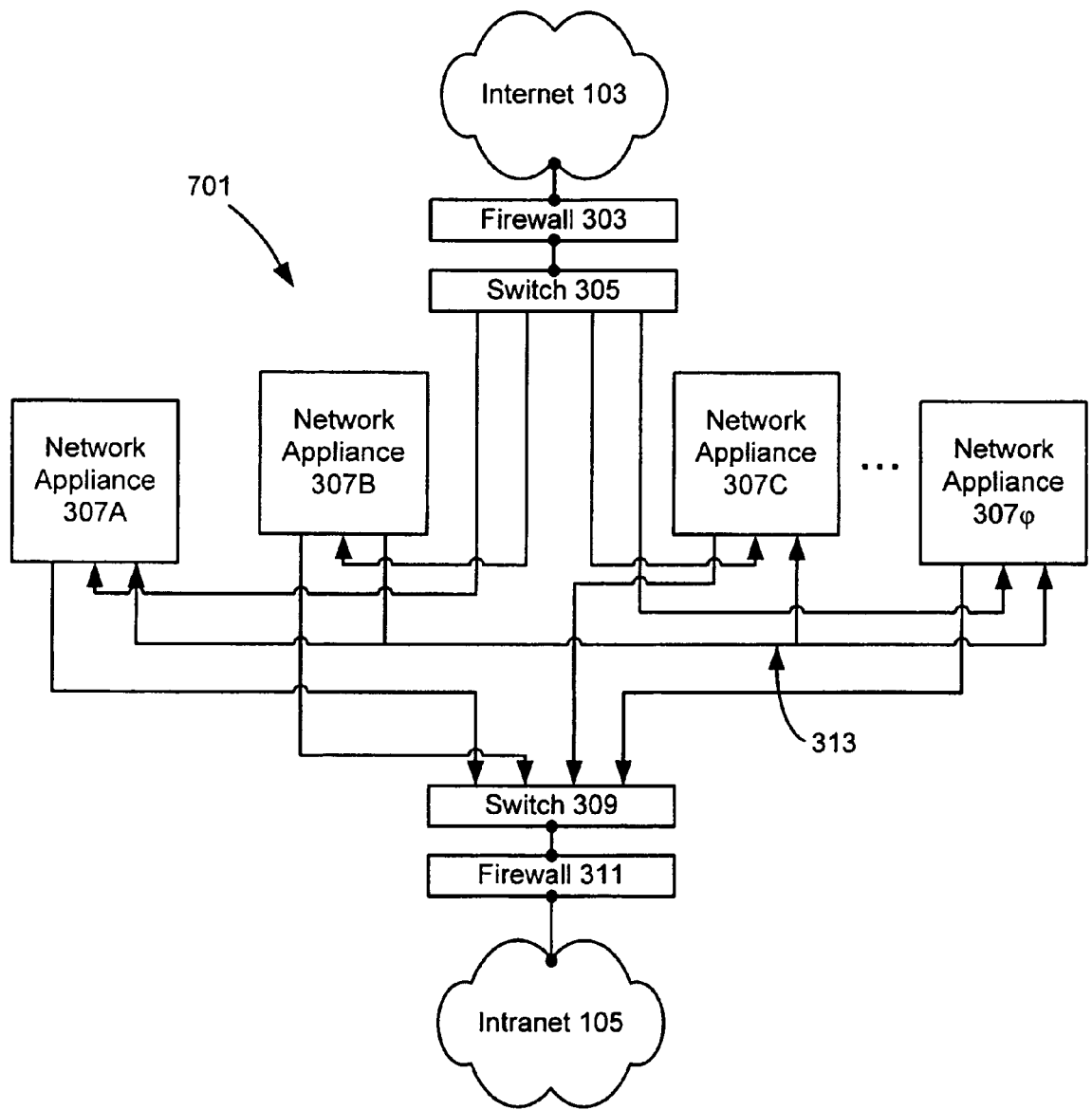
FIG. 7 shows an example of a network employing N+1 number of network appliances according to various examples of the invention.

While the particular embodiments of the invention described above have related to networks with only two network appliances 307, it should be appreciated that alternate embodiments of the invention may employ any desired number of network appliances 307. For example, FIG. 7 illustrates a network 701 that employs network appliances 307A, 307B, 307C . . . 307 (p, where the network appliance 307*cep* is the N+1 network appliance 307 in the network 701 and N may be any desired number suitable to meet the scale of client communication with the failure of one network appliance 307.

It should be appreciated that most of the foregoing description regarding networks employing only network appliances 307A and 307B are applicable to networks having N+1 network appliances 307, such as the network 701. For example, As with the previously described embodiments, all of the platform services on each of the network appliance 307A-307<p will be active, while only a single load balancing service 401 on a network appliance 307 will be active (i.e., only one load balancing service 401 will be the primary load balancing service 401). Similarly, the distributed cache service 417 will distribute desired information among all of the network appliances 307A-307 (p in the network, while the administrative management console service 415 may similarly replicate policy rules and configuration information among all of the network appliances 307A-307 (p in the network. Likewise, data can be exchanged between each of the network appliances 307A-307 (p over the backplane 313. Because the backplane 313 services more than two network appliances 307, however, it will additionally include a switch (not shown).

With a network employing N+1 network appliances 307 where N>1, however, two or more load balancing services 401 (other than the primary load balancing service 401) will be available to serve as standby load balancing services 401. If the primary load balancing service 401 fails, any desired technique may be used to select the new primary load balancing service 401 from among the group of standby load balancing service 401. The selection of a new primary load balancing service 401 may be made by, for example, an election among the standby load balancing services 401, by selecting the standby load balancing service 401 with the highest or lowest network address, or by simply going in order from a previously devised list.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while particular software services and processes have been described as performing various functions, it should be appreciated that the functionality of one or more of these services and processes may be combined into a single service or process, or divided among additional services and processes.

What is claimed is:

1. A method for routing a communication to a platform service, the method comprising:
receiving a first message and a second message in a first communication;
sending an acknowledgement message to a source of the first communication in reply to the first message;
analyzing payload data contained in the second message to identify a communication type, wherein the communication type is specific to one of a plurality of platform service types available for routing, the available plurality of platform service types including a virtual private network platform service and an extranet platform service;
sending a first message and a second message in a second communication to a corresponding platform service of the platform service type specific to the communication type indicated by the payload data, wherein the second message in the second communication includes the payload data contained in the second message of the first communication;
receiving an acknowledgement of the first message from the corresponding platform service;
receiving a reply responsive to the second message in the second communication from the corresponding platform service; and
relaying the reply from the corresponding platform service to the source of the first communication.

2. The method of claim 1, wherein the first and second messages in the first communication are sequentially numbered and the first and second messages in the second communication are sequentially numbered differently from the first and second messages in the first communication; and the method further comprises:
modifying the sequential numbering of the second message in the first communication to correspond with the sequential numbering of the second communication with the corresponding platform service, and
modifying the sequential numbering of the reply to the second message in the second communication to correspond with the sequential numbering of the first communication.

3. A method for routing a first communication to a platform service, the method comprising:
receiving the first communication comprising payload data;
determining a communication type for the first communication based on at least information provided by the payload data, wherein the communication type is specific to one of a plurality of platform service types available for routing, the available plurality of platform service types including a virtual private network platform service and an extranet platform service; and
relaying the first communication to a corresponding platform service being of the platform service type specific to the communication type of the first communication.

4. The method of claim 3, further comprising receiving a reply from the corresponding platform service and relaying the reply to a source of the first communication.

5. The method of claim 3, wherein the first communication is transmitted using sequentially numbered packets.

6. The method of claim 3, further comprising:
receiving a second communication, the second communication directed to a same internet protocol (IP) address and comprising different payload data than the payload data of the first communication; and
determining a communication type for the second communication based on at least information provided by the different payload data, wherein one of the first and second communications is determined to be a communication type specific to a virtual private network platform service and the other of the first and second communications is determined to be a communication type specific to an extranet platform service.

7. The method of claim 3, wherein the payload data of the first communication includes a virtual private network protocol frame.

8. The method of claim 3, wherein the payload data of the first communication includes a secure socket layer (SSL) helo message.

9. The method of claim 3, further comprising sending an acknowledgement to a source of the first communication in response to receiving a portion of the first communication.

10. The method of claim 3, further comprising receiving a reply from the available platform service in response to the relayed first communication.

11. The method of claim 10, further comprising forwarding the received reply to a source of the relayed first communication.

12. The method of claim 10, further comprising sending an acknowledgement to the corresponding platform service in response to the received reply.

13. The method of claim 3, wherein the virtual private network platform service has a different port number than the extranet platform service.

14. The method of claim 3, wherein port numbers for the virtual private network platform service and the extranet platform service are set based on user input.

15. The method of claim 14, wherein the first communication is sent to a port number associated with a transfer protocol and wherein the port number associated with the transfer protocol is different from the port numbers set for the virtual private network platform service and the extranet platform service.

16. A system for routing a communication to a platform service, the system comprising:
an input configured to receive the communication comprising payload data;
a processor configured to execute instructions stored in memory for determining a communication type based on at least information provided by the payload data and received at the input wherein the communication type is specific to one of a plurality of platform service types available for routing, the available plurality of platform service types including a virtual private network platform service and an extranet platform service; and
an output configured to relay the communication received at the input to a corresponding platform service being of the platform service type specific to the communication type of the communication, the corresponding platform service selected from a plurality of platform services.

17. A non-transitory computer-readable storage medium, having embodied thereon a program executable by a processor to perform a method for routing a first communication to a platform service, the method comprising:

receiving the first communication comprising payload data;

determining a communication type for the first communication based on at least information provided by the payload data, wherein the communication type is specific to one of a plurality of platform service types available for routing, the available plurality of platform service types including a virtual private network platform service and an extranet platform service; and relaying the first communication to a corresponding platform service of the platform service type specific to the communication type of the first communication.

* * * * *

UNITED STATES PATENT AND TRADEMARK OFFICE
CERTIFICATE OF CORRECTION

| | | |
|---|---|---|
| PATENT NO. | : 8,700,775 B2 | Page 1 of 2 |
| APPLICATION NO. | : 11/903219 | |
| DATED | : April 15, 2014 | |
| INVENTOR(S) | : Chris Hopen et al. | |

It is certified that error appears in the above-identified patent and that said Letters Patent is hereby corrected as shown below:

In the Specification

Column 1 Lines 7-10 should read

"This application is a divisional and claims the priority benefit of U.S. patent application 10/733,808 filed December 10, 2003, now U.S. patent 8,572,249, the disclosure of which is incorporated by reference."

In the Claims

Column 25 Lines 40-45 Claim 2 should read:

"The method of claim 1, wherein the first and second messages in the first communication are sequentially numbered and the first and second messages in the second communication are sequentially numbered differently from the first and second messages in the first communication; and the method further comprising: comprises:..."

Column 25 Lines 54-67 Claim 3 should read:

"A method for routing a first communication to a platform service, the method comprising: receiving the first communication comprising payload data; determining a communication type for the first communication based on at least information provided by the payload data, wherein the communication type is specific to one of a plurality of platform service types available for routing, the available plurality of platform service types including a virtual private network platform service and an extranet platform service; and relaying the first communication to a corresponding platform service being of the platform service type specific to the communication type of the first communication."

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,700,775 B2

Column 26 Lines 28-30 Claim 10 should read:

"The method of claim 3, further comprising receiving a reply from the ~~available~~ <u>corresponding</u> platform service in response to the relayed first communication."

Column 26 Lines 49-65 Claim 16 should read:

"A system for routing a communication to a platform service, the system comprising: an input configured to receive the communication comprising payload data; a processor configured to execute instructions stored in memory for determining a communication type based on at least information provided by the payload data and received at the input wherein the communication type is specific to one of a plurality of platform service types ~~available~~ for routing, the ~~available~~ plurality of platform service types including a virtual private network platform service and an extranet platform service; and an output configured to relay the communication received at the input to a corresponding platform service ~~being~~ of the platform service type specific to the communication type of the communication, the corresponding platform service selected from a plurality of platform services."

Column 26 Lines 66-67 and Column 27 Lines 1-15 Claim 17 should read:

"A non-transitory computer-readable storage medium, having embodied thereon a program executable by a processor to perform a method for routing a first communication to a platform service, the method comprising: receiving the first communication comprising payload data; determining a communication type for the first communication based on at least information provided by the payload data, wherein the communication type is specific to one of a plurality of platform service types ~~available~~ for routing, the ~~available~~ plurality of platform service types including a virtual private network platform service and an extranet platform service; and relaying the first communication to a corresponding platform service of the platform service type specific to the communication type of the first communication."